(12) United States Patent
Varghese et al.

(10) Patent No.: US 9,467,419 B2
(45) Date of Patent: Oct. 11, 2016

(54) SYSTEM AND METHOD FOR N PORT ID VIRTUALIZATION (NPIV) LOGIN LIMIT INTIMATION TO CONVERGED NETWORK ADAPTOR (CNA) IN NPIV PROXY GATEWAY (NPG) MODE

(71) Applicant: Dell Products L.P., Round Rock, TX (US)

(72) Inventors: Vibin Varghese, Kerala (IN); Rajashekar Jayaraj, Chennai (IN); Elayarajan Kannan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 1 day.

(21) Appl. No.: 14/580,002

(22) Filed: Dec. 22, 2014

(65) Prior Publication Data

US 2016/0182449 A1    Jun. 23, 2016

(51) Int. Cl.
*H04L 29/06* (2006.01)

(52) U.S. Cl.
CPC ....... *H04L 63/0209* (2013.01); *H04L 63/0281* (2013.01); *H04L 63/101* (2013.01)

(58) Field of Classification Search
None
See application file for complete search history.

(56) References Cited

U.S. PATENT DOCUMENTS

| 8,898,346 | B1 * | 11/2014 | Simmons | G06F 13/102 710/62 |
| 2008/0313724 | A1 * | 12/2008 | Doddapaneni | H04L 49/357 726/9 |
| 2011/0116450 | A1 * | 5/2011 | Hirano | H04W 12/06 370/328 |
| 2013/0191434 | A1 * | 7/2013 | Smith | G06F 9/542 709/201 |
| 2015/0067819 | A1 * | 3/2015 | Shribman | H04L 65/4084 726/12 |

* cited by examiner

*Primary Examiner* — David Pearson
(74) *Attorney, Agent, or Firm* — North Weber & Baugh LLP (57) ABSTRACT

Aspects of the present invention include an NPG system that can stop the CNA from requesting a login if the system has reached the ACL login limit. In embodiments of the present invention, the number of available logins can be dynamically calculated and sent to the CNA.

17 Claims, 6 Drawing Sheets

SYSTEM AND METHOD FOR N PORT ID VIRTUALIZATION (NPIV) LOGIN LIMIT INTIMATION TO CONVERGED NETWORK ADAPTOR (CNA) IN NPIV PROXY GATEWAY (NPG) MODE

BACKGROUND

1. Field of Invention

The present invention relates generally to storage area networks and devices, and relates more particularly to N port identifier virtualization (NPIV) proxy gateway (NPG) mode.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, some standards have developed related to network storage. One example is Fibre Channel (FC). Fibre channel is a high speed network technology used to connect computer data storage. Fibre channel is often used in connecting Storage Area Networks (SAN's) in enterprise storage.

A switched fabric topology can be used with fibre channel. In a switched fabric topology all ports are connected to fibre channel switches. Ports can be any entity that communicates over the network.

Node Port Identifier Virtualization (NPIV) is a fibre channel feature whereby multiple fibre channel node port IDs can share a single physical node port. This allows multiple fibre channel initiators to occupy a single physical port.

Prior art solutions for configuring per end node port (enode) port is limited to 32 or 64 sessions in an Node Port Identifier Virtualization (NPIV) Proxy Gateway (NPG/FSB). This limit is present due to the Access Control List (ACL) regions, which is the secure link from the enode to the storage network to implement fip-snooping capability in a secure way. Therefore, in the prior art the limit of 32 or 64 can be reached in NPG mode.

Figure 1:
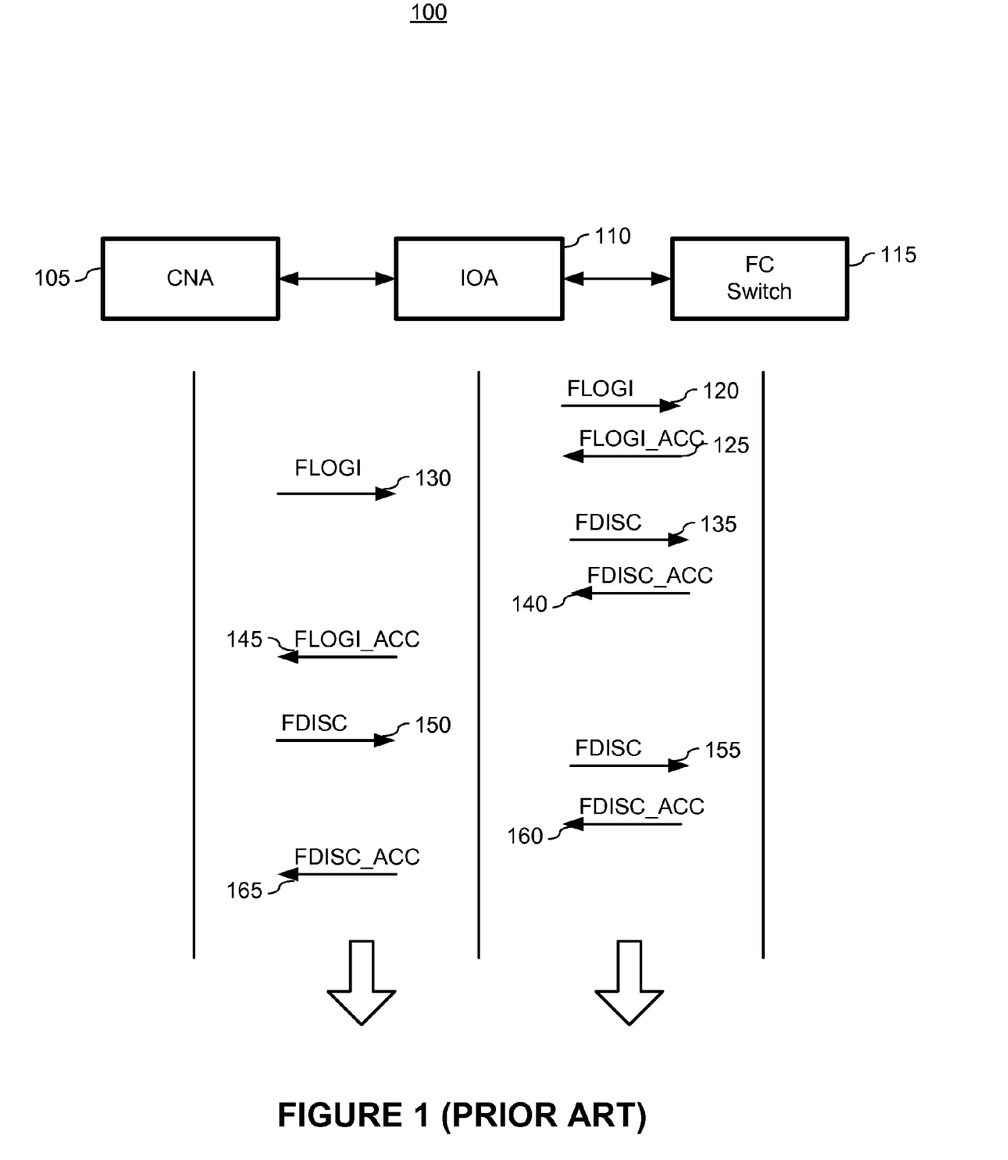
FIG. 1 depicts a prior art NPIV system and login sequence.

FIG. 1 shows a prior art embodiment of a system 100 using NPIV and a login sequence using NPIV. FIG. 1 shows a Converged Network Adapter (CNA) 105 communicates with an input-output accelerator (IOA) 110. IOA 110 communicates with an FC switch 115. A prior art login sequence using NPIV, includes communication between the IOA 110 and FC Switch 115, including communication 120, 125, 135, 140, 155, and 160. Prior art login sequence also shows communication between the CNA 105 and the IOA 110 including communication 130, 145, 155, and 165. Figure shows IOA 110 sends FC switch 115 a fabric login (FLOGI) 120, FC Switch 115 sends to IOA 110 a fabric login accept (FLOGI_ACC) 125. CNA 105 sends to IOA 110 an FLOGI 130. IOA 110 sends to FC switch 115 fabric discovery (FDISC) 135. FC Switch 115 sends to IOA 110 fabric discovery accept (FDISC_ACC) 140. IOA 110 sends to CNA 105 FLOGI_ACC 145. CNA 105 sends to IOA 110 FDISC 150. IOA 110 sends to FC switch 115 FDISC 155. FC switch sends to IOA FDISC_ACC 160. IOA 110 sends to CNA 105 FDISC_ACC 165.

The 32 or 64 session limit does not guarantee per port logins, but depends on the utilized and available ACL regions. There is no way to intimate the Converged Network Adapter (CNA) to stop further Fabric Discovery (FDISC) retries, if the CNA does more logins than the configured enode limit or if the ACL region is elapsed.

Figure 2:
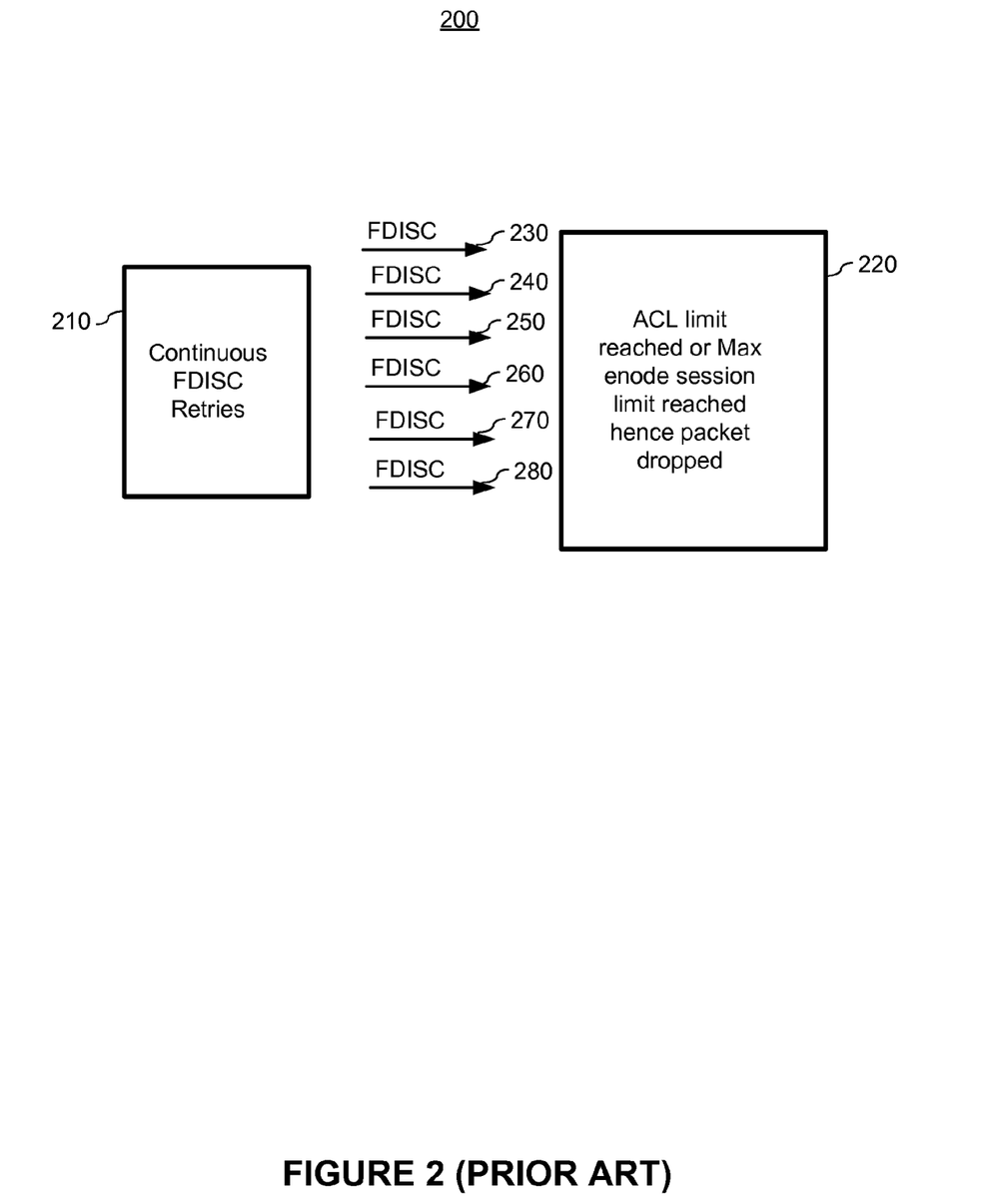
FIG. 2 depicts a prior art login sequence.

FIG. 2 shows a block diagram of a prior art login sequence 200 including continuous FDISC retries 210 and 230, 240, 250, 260, 270, and 280. It also shows ACL limit reached or Max enode session limit reached hence packet dropped 220. It shows depicts the continuous FDISC retries.

This continuous FDSIC re-trials (~2 sec) make use of Central Processing Unit (CPU) cycles of both the CNA and NPG/IOA. The NPG/IOA CPU processes the Virtual Link initial request and then drops it as the limit is already reached, leading to extra CPU processing at the NPG/IOA side. Also, there is no intimation to the CNA for failure of response of FDSIC request and hence the CNA keeps trying leading to CNA CPU consumption. If the ACL limit is reached the sessions could flap before stabilizing.

One disadvantage of the prior art system is that there is no way to stop the CNA from making further FDISC requests if the ACL limit has been reached.

Another disadvantage of the prior art system is that CPU consumption is used both at the CNA and the NPG/IOA.

Accordingly, what is needed are systems and methods that can achieve NPIV login limit intimation to the CNA in NPG mode.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, better bandwidth usage, better scalability, and better reliability by mitigating the effects of down links and other points of failure across data networks. It shall also be noted that although embodiments described herein may be within the context of non-unicast transmission and port extender network environments, the invention elements of the current patent document are not so limited. Accordingly, the invention elements may be applied or adapted for use in other contexts.

As described above, in prior art solutions, there is no way to intimate the CNA to stop FDISC retries when the ACL limit has been reached. In one embodiment of the present invention, there is a mechanism to intimate the CNA to stop FDISC retries when the ACL limit has been reached.

Figure 3:
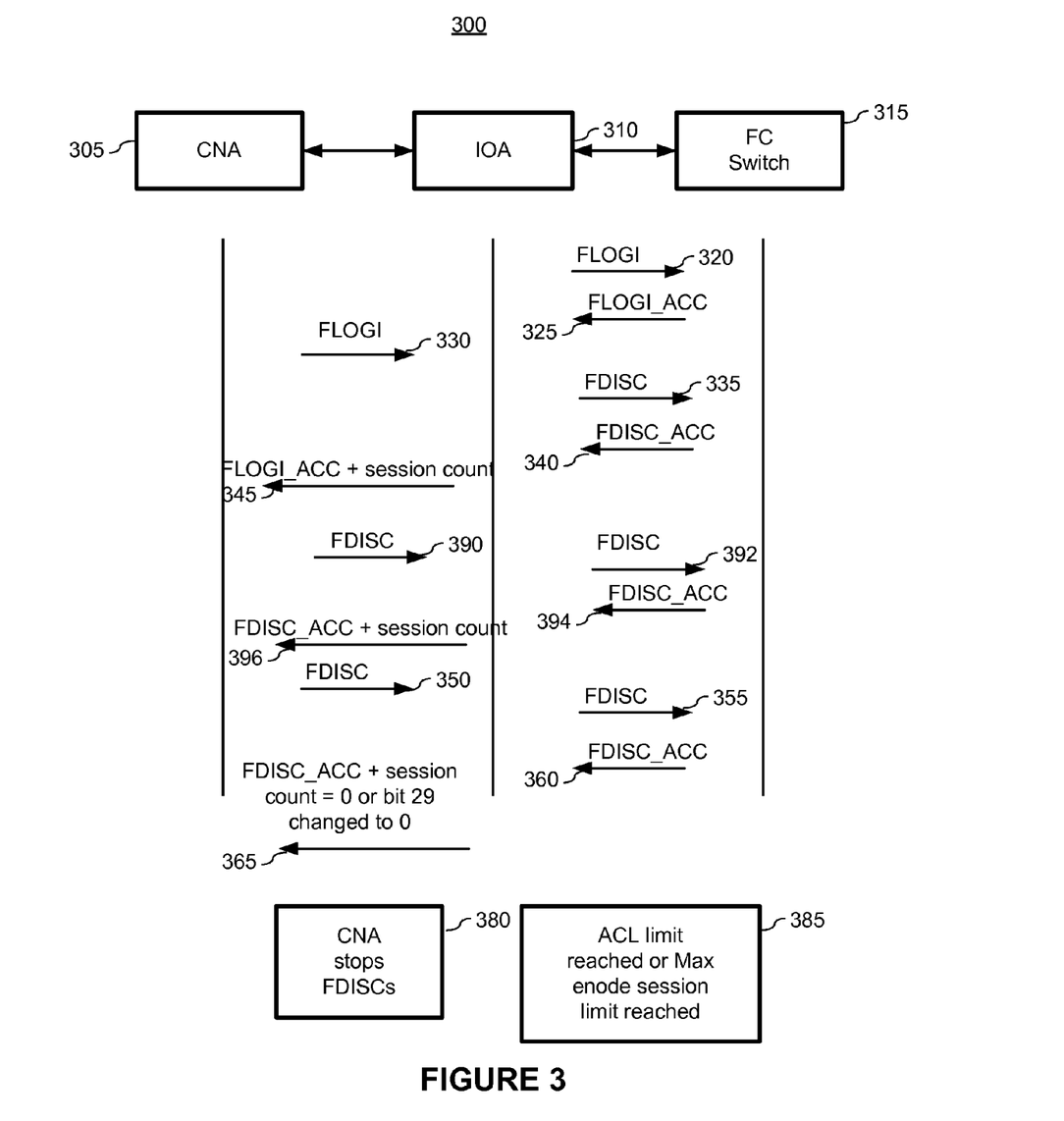
FIG. 3 depicts an example of an NPIV system and login sequence according to embodiments of the present invention.

FIG. 3 shows a block diagram of a system 300 in accordance with the present invention. FIG. 3 shows CNA 305 in communication with IOA 310 and IOA 310 in communication with FC switch 315. FIG. 3 also shows the login sequence in accordance with an embodiment of the present invention. IOA 310 sends FLOGI 320 to FC switch 315. FC switch 315 sends FLOGI_ACC 325 to IOA 310. CNA 305 sends FLOGI 330 to IOA 310. IOA 310 sends FDISC 335 to FC switch 315. FC switch 315 sends FDISC_ACC 340 to IOA 310. IOA 310 sends FLOGI_ACC and session count 345 to CNA 305. In one embodiment, the CNA 305 can send another FDISC sequence (FDISC 390 from the CNA 305 to the IOA 310, FDISC 392 from the IOA 310 to the FC switch 315, FDISC_ACC 394 from the FC Switch 315 to IOA 310 and FDISC_ACC plus session count 396 from the IOA 310 to the CNA 305) to the IOA 310 and the FC switch 315. CNA 305 send FDISC 350 to IOA 310. IOA 310 send FDISC 355 to FC Switch 315. FC switch 315 sends FDISC_ACC 360 to IOA 310. IOA 310 sends FDISC_ACC and session count equal to zero or bit 29 set to 0 365 to CNA 305 once the Max enode session limit is reached or ACL limit is reached on IOA 310 with this 365 session being created. FIG. 3 also shows CNA will stop FDISC requests 380 and ACL limit reached or maximum enode session limit reached in IOA/NPG NPIV uses a particular bit in an FC frame common services, bit 29, to indicate whether NPIV functionality is supported. If bit 29 is set to 1, then NPIV is supported. If bit 29 is set to 0, then NPIV is not supported. The CNA 305 reads bit 29 to determine whether it can request multiple logins. If bit 29 is set to 1, then the CNA 305 can request multiple logins. If bit 29 is set to 0, then the CNA 305 will not request multiple logins. This functionality is supported presently only for FLOGI_ACC.

If NPIV is supported, the CNA 305 will request multiple logins and for each FLOGI request, the CNA 305 will get back an FLOGI_ACC and an address. In one embodiment, an NPG system can indicate that it supports NPIV and also the number of logins that it supports. In one embodiment, the FLOGI_ACC frame can be updated to include the maximum number of logins supported. In another embodiment, the NPG system can dynamically calculate how many logins are supported and send that information to the CNA 305 in the FLOGI_ACC and FDISC_ACC frame. In one embodiment, each login gets mapped to a section in the device in the IOA 310 of the NPG. The amount of address space is also known. Therefore, the amount of access space remaining can also be calculated by the IOA/NPG switch. The IOA/NPG switch can be a Fibre Channel over Ethernet (FCoE) switch. In one embodiment, then the ACL login limit is reached, the response back to the CNA 305 will be that the session count is 0. In another embodiment, bit 29 can be set to 0 to indicate to the CNA 305 to stop attempting logins.

In one embodiment, the ACL region is shared among all the server ports of the NPG/IOA switch 310 and in the embodiment that FLOGI ACC includes "x" sessions as currently available, but in the meantime the available ACL region usage limit has been reached by some other CNA connected to another port. In one embodiment, FDISC_ACC can be used to inform the current re-trying CNA to stop sending more FDISCs.

In another embodiment, if bit 29 is set to 0, then all CNA's 305 will understand that the device has exhausted resources for processing more FDISC requests.

In one embodiment, ACL space can be made available, for example due to logouts, the CNA's 305 can resume requesting logins. This can be achieved by using descriptors (FIP) in multicast discovery advertisements to intimate the availability to the CNA for further login.

Figure 4:
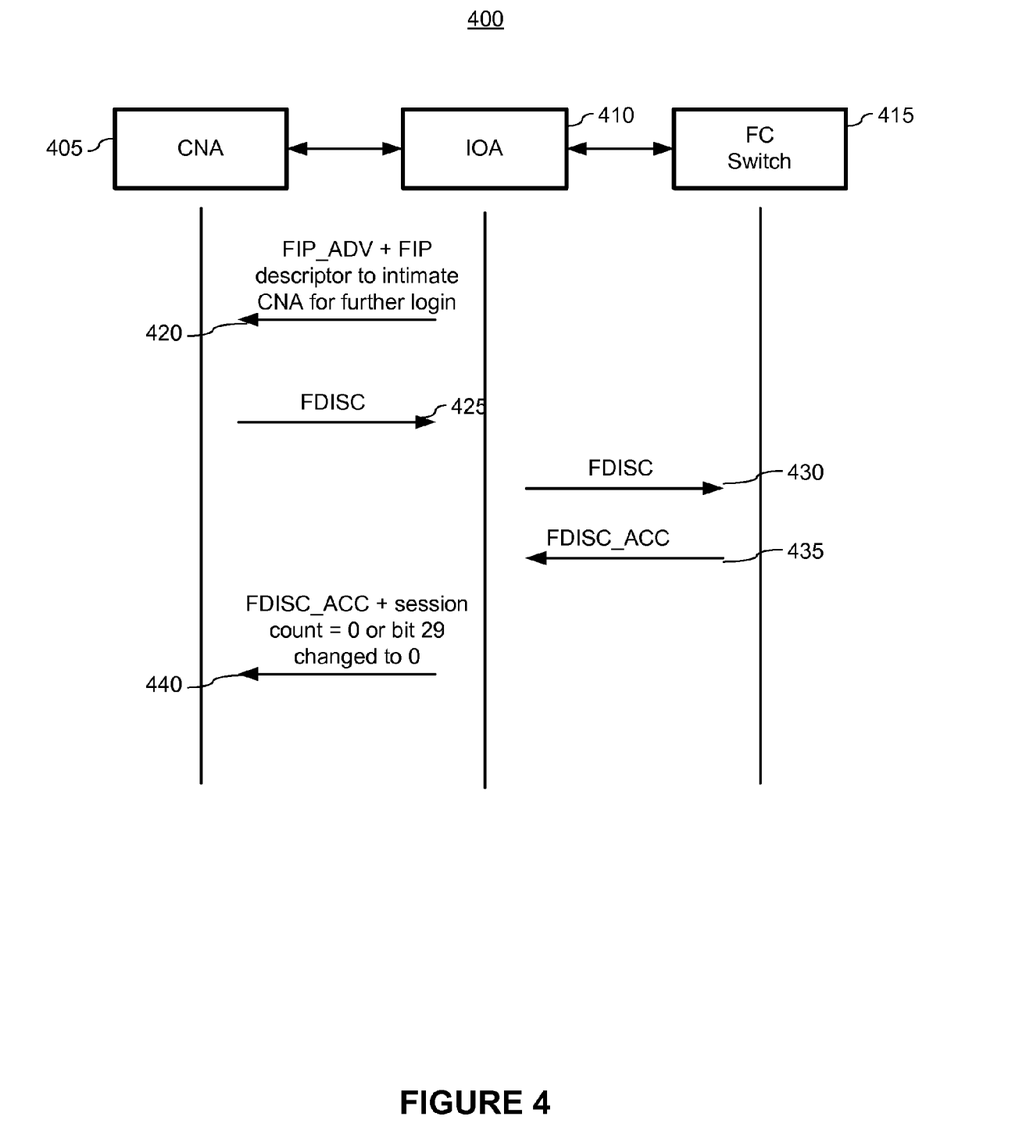
FIG. 4 depicts an example of an NPIV login sequence according to embodiments of the present invention.
Figure 5:
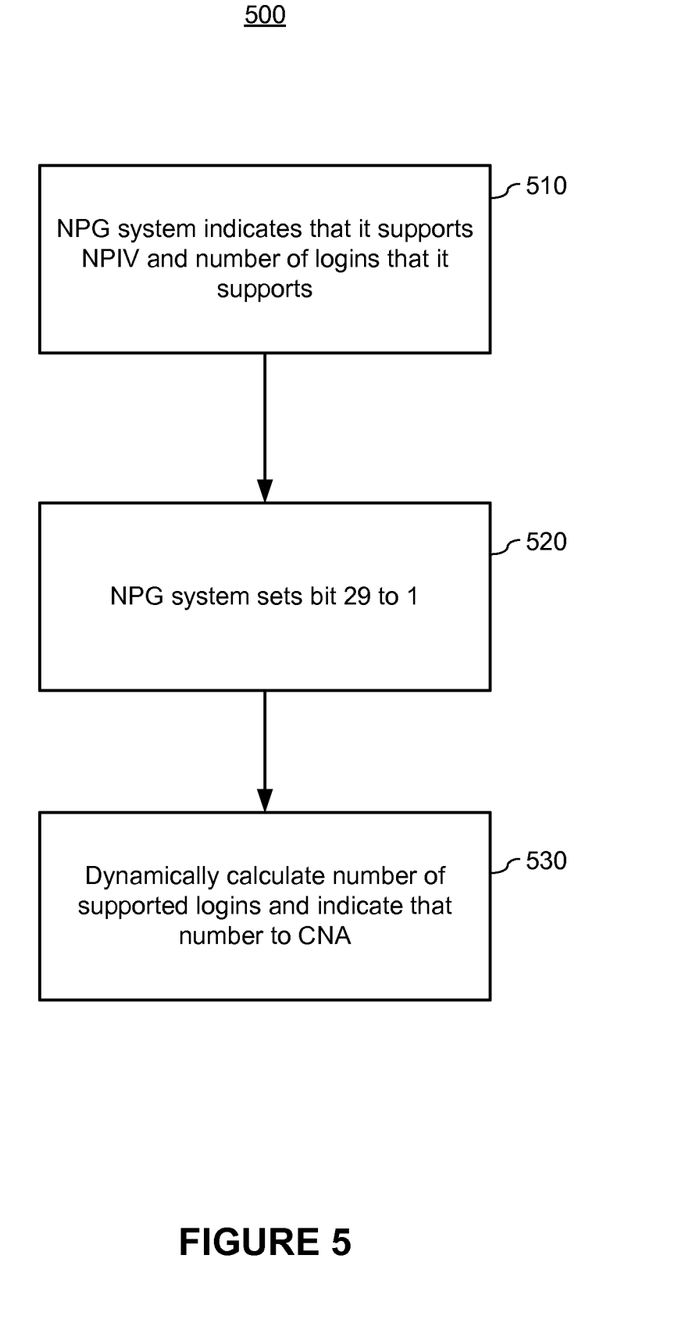
FIG. 5 depicts a flow chart of a method according to embodiments of the present invention.

FIG. 4 shows a block diagram 400 of an NPG system in accordance with the present invention. FIG. 4 shows a login sequence that can occur after additional ACL space becomes available. FIG. 4 shows CNA 405, IOA 410, and FC switch 415. Figure also shows IOA 410 sending FIP_ADV and FIP descriptor to intimate CNA for further login 420. CNA 405 sends FDISC 425 to IOA 410. IOA 410 sends FDISC 430 to FC switch 415. FC switch 415 sends FDISC_ACC 435 to IOA 410. IOA 410 sends FDISC_ACC and session count=0 or bit 29 changed to 0 to the CNA 405 with assumption that ACL limit will be reached with this one FDISC session addition. Session count response can be non-zero based on the available ACL space freed-up due to logouts FIG. 5 shows a flow chart of a method 500 in accordance with an embodiment of the present invention. FIG. 5 shows an NPG system indicates that it supports NPIV and number of logins that it supports 510, an NPG system sets bit 29 to 1 520, and dynamically calculating the number of supported logins and indicate that number to CNA 530.

Figure 6:
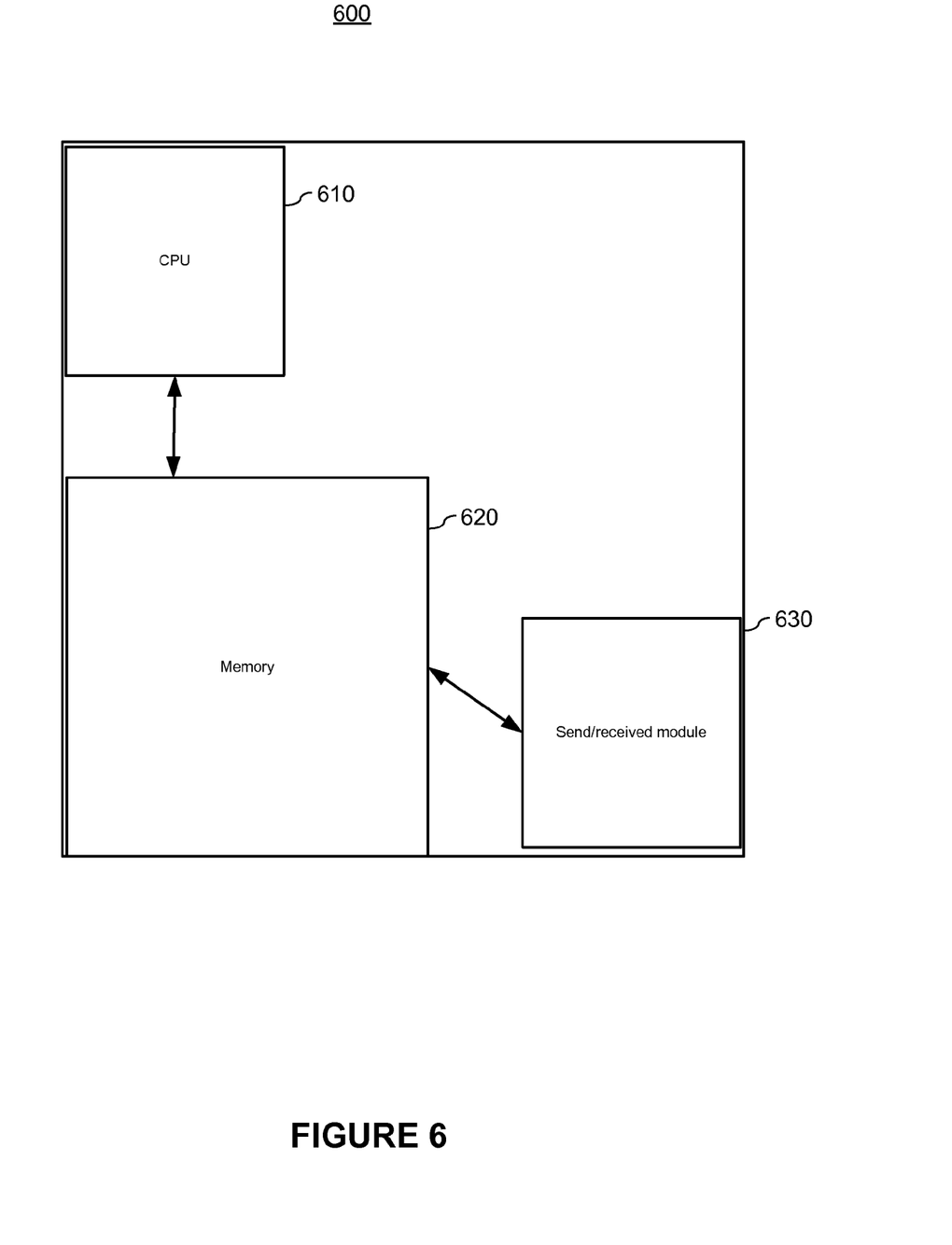
FIG. 6 depicts a block diagram of a switch according to embodiments of the present invention.

FIG. 6 shows a block diagram of a switch according to embodiments of the present invention. FIG. 6 shows switch 600 including a CPU 610 and memory 620. CPU 610 can perform the calculating functions described with reference to FIGS. 3-5, above. Memory 620 can store the results of the calculations. Send/receive module 630 can send or received information.

Embodiments of the present invention have many advantages. For example, they are conserving the valuable hardware resources of the IOA/NPG switch and CNA.

Other advantages include introducing more intelligence in both the IOA/NPG switch as well as the CNA by permitting 2-way communication.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. An information handling system in a Node Port Identifier Virtualization Proxy Gateway (NPG) environment, comprising:
    a converged network adapter, configurable to receive information pertaining to a number of available logins in the NPG environment;
    an input output aggregator (IOA/NPG) switch coupled to the converged network adapter, configurable to determine and to communicate the number of available logins to the converged network adaptor; and
    a fibre channel switch, coupled to the input output aggregator (IOA/NPG), to get the FC address for the fibre channel traffic.

2. The information handling system of claim 1 wherein the IOA is a NPIV Proxy Gateway FCoE switch.

3. The information handling system of claim 1 wherein the number of available logins is determined based on a limit of logins available.

4. The information handling system of claim 1 wherein the number of available logins is determined dynamically based on an availability of address space.

5. The information handling system of claim 1 wherein the IOA/NPG switch sets a particular bit to zero to indicate that there are no available logins.

6. The information handling system of claim 1 wherein the IOA/NPG switch communicates that the login limit is reached.

7. The information handling system of claim 1 wherein the converged network adaptor receives information when a login becomes available.

8. A method for logging into a system with multiple allowed logins, the method preformed in a Node Port Identifier Virtualization Proxy Gateway (NPG) environment, the method comprising:
    indicating that multiple logins are supported;
    setting a particular bit to one to indicate that multiple logins are supported;
    calculating a number of supported logins; and
    sending the number of supported logins to a converged network adaptor.

9. The method of claim 8 wherein the calculating is done dynamically to determine the number of available logins.

10. The method of claim 8 wherein the method is done in an IOA/NPG FCoE device.

11. The method of claim 8 wherein the calculating is done statically based on a number of permitted logins.

12. The method of claim 8 further comprising recalculating the number of available logins in the event that a logout occurs.

13. The method of claim 8 further comprising notifying the converged network adaptor when a logout occurs.

14. An IOA/NPG FCoE switch used in a Node Port Identifier Virtualization Proxy Gateway (NPG) environment, the switch comprising:
- a central processing unit configured to calculate a number of available logins;
- a memory configured to store the results of the calculations; and
- a IOA/NPG FCoE switch configured to send the number of available logins for receipt by a converged network adaptor.

15. The IOA/NPG FCoE switch of claim 14 wherein the calculation of the number of available logins is done based on the number of permitted logins.

16. The IOA/NPG FCoE switch of claim 14 wherein the calculation of the number of available logins is done dynamically to determine the number of logins available.

17. The IOA/NPG FCoE switch of claim 14 wherein the send module further sends information pertaining to logouts.

\* \* \* \* \*